United States Patent

Holland et al.

[11] 3,982,059
[45] Sept. 21, 1976

[54] FLEXIBLE CABLE TERMINATION

[75] Inventors: William P. Holland, West Redding; William H. Merritt, Canton, both of Conn.

[73] Assignee: The Machlett Laboratories, Incorporated, Stamford, Conn.

[22] Filed: Oct. 17, 1975

[21] Appl. No.: 623,294

Related U.S. Application Data

[63] Continuation of Ser. No. 536,668, Dec. 26, 1974, abandoned.

[52] U.S. Cl. .......................... 174/73 R; 174/75 D; 339/59 M; 339/61 M; 339/159 R; 339/183
[51] Int. Cl.² ................ H02G 15/02; H01R 11/02; H01R 21/22
[58] Field of Search .............. 174/73 R, 74 R, 75 R, 174/75 D, 78; 339/14 R, 59 R, 59 M, 60 R, 60 M, 61 R, 61 M, 62, 63 M, 143 C, 159 R, 182 R, 183

[56] References Cited

UNITED STATES PATENTS

| 2,280,711 | 4/1942 | Machlett et al. ............... 174/75 D X |
| 3,289,149 | 11/1966 | Pawloski .............................. 339/183 |
| 3,772,545 | 11/1973 | Hatschek ........................ 339/183 X |

*Primary Examiner*—Laramie E. Askin
*Attorney, Agent, or Firm*—H. A. Murphy; Joseph D. Pannone; John T. Meaney

[57] ABSTRACT

A flexible cable termination for high voltage cables such as used in x-ray apparatus, which termination has an outside diameter only slightly larger than the diameter of the cable, and has flexibility provided by encasing the cable wires in a flexible sheath which provides the cable termination assembly with the ability to be bent to relatively small curvatures, and further includes means for attaching the cable grounding braid to an encircling grounding terminal.

2 Claims, 5 Drawing Figures

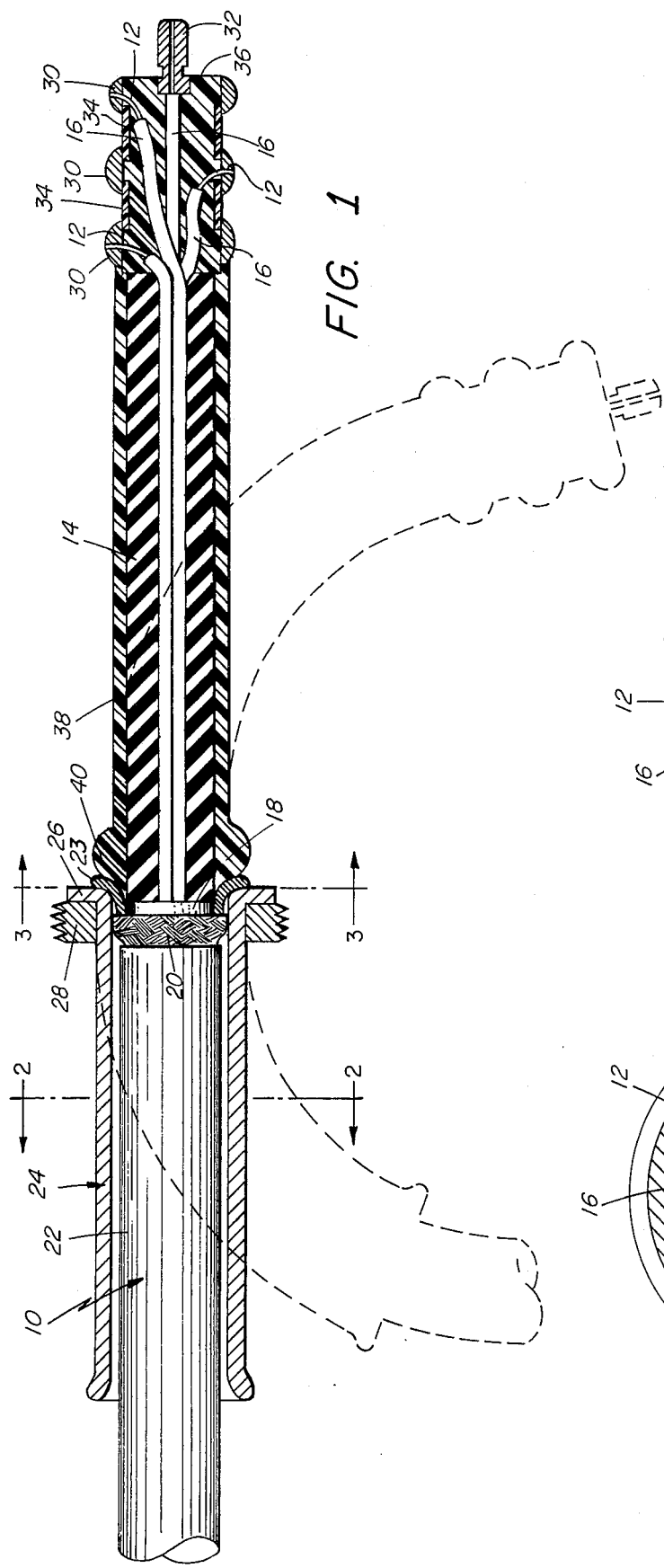
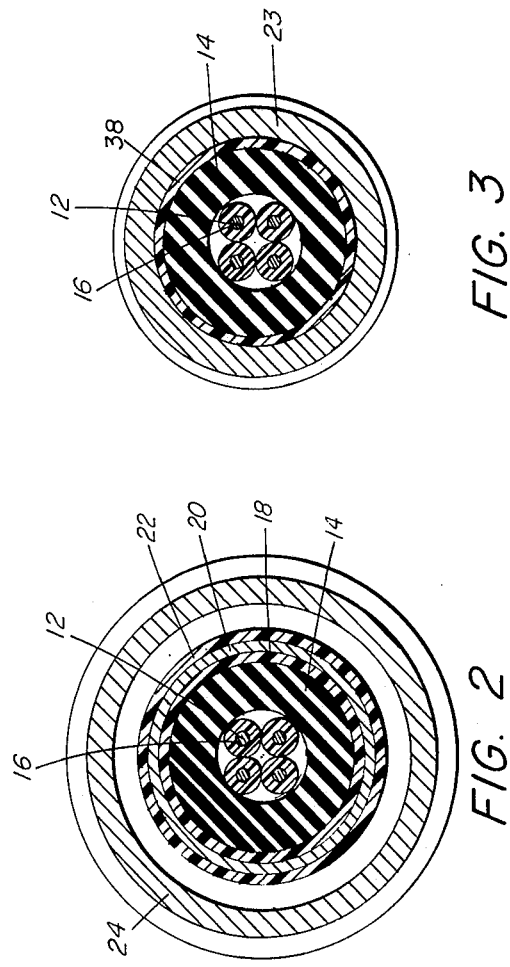

FLEXIBLE CABLE TERMINATION

CROSS-REFERENCE TO RELATED CASES

This is a continuation of application Ser. No. 536,668, filed Dec. 26, 1974 now abandoned.

BACKGROUND OF THE INVENTION

In the manufacture of x-ray tubes or other electronic devices which require the use of high voltages for their successful operation, specially designed high voltage cable terminations are used for connecting the device to a cable which supplies the required voltage. For example, an x-ray device comprises an x-ray generator or tube mounted in an oil-filled housing which includes a pair of female receptacles to which the ends of the tube are electrically connected. To each receptacle is connected a mating termination which is fixed to the end of a high voltage cable. Thus, high voltage electrical energy is supplied to the tube from a suitable external energy source. An example of a cable termination structure is found in U.S. Pat. No. 2,522,572.

Contemporary designs of high voltage cable terminations are basically electrically and mechanically sound. However, in several areas improvements are necessary. For example, the termination is complex to fabricate and requires a potting operation in which the assembly is filled with a liquid filling compound which requires several hours to harden. The potting operation is designed to drive air from the insides of the assembly, adhere to the prepared cable ends, and yield an electrically stable assembly.

Electrical breakdown does occasionally occur, however, due to the fact that the filling process has never been perfected to the point of always assuring a satisfactory bond. This deficiency paves the way for possible electrical creepage along the surface of the cable, between the cable and filling compound, and eventually to ground.

Known cable terminations are also relatively large and rigid and require a mating receptacle in the housing to also be large and to therefore occupy a relatively large volume of the housing. The cable receptacles in the housings are located in horns which are protruding portions extending from an otherwise cylindrical housing which conveniently may be approximately eighteen inches long and about six inches in diameter.

Termination of high voltage cables into housing horns takes up considerable space external to the housing to the extent that the relationship of the horns and other portions of the housing such as an x-ray port window in the housing is of prime importance in field installations. As a result of the needs of various installations, complex rotating sections have been built into x-ray housings to allow for proper orientation of the horns and port window.

Where x-ray systems are to be provided in hospital installations, it is required that high voltage cables be placed within conduit and sometimes pulled considerable distances. The outer diameter of known terminations prevents them from being inserted into and drawn through conduits and this usually requires that the end of the cable be terminated after the cable has been drawn through the conduit. As mentioned previously, the complexity in the structure and in the assembly process itself makes it difficult and time consuming to perform the termination in the field and, as a result, quality is often lacking in field-terminated cable end structures. Electrical failure usually occurs in a poor quality high voltage cable termination.

SUMMARY OF THE INVENTION

The present invention improves prior art devices of the character described primarily in two ways, first, by improving electrical integrity and, second, by size reduction. The herein described high voltage cable termination eliminates the above-discussed problems of the prior art and has other advantages which will be apparent from the detailed description of the invention herein.

The invention comprises a cable termination which is small in diameter, completely flexible, and electrically reliable. This is achieved by providing at one end of a high voltage cable a number of contacts in the form of coaxial circumferentially extending rings or contact pins, the contact portion of the cable being filled with an appropriate filling compound. The cable insulation is covered with a flexible shield such as a heat shrinkable tubing or flexible potting material. The metal grounding braid which overlies the cable insulation is terminated near the end of the termination structure opposite the contact portion and is attached to an encircling grounding terminal by means of soft solder or the like. The grounding terminal has an outer diameter which is only slightly larger than the diameter of the cable covering and is adapted to mate with a small-diameter receptacle on the housing and to be retained thereon by a nut and split strain relief combination.

The termination structure thus can be plugged into a socket which may be in curved or straight form and the termination will bend if necessary as it is inserted into the socket.

BRIEF DESCRIPTION OF THE DRAWINGS

The above and other objectives of the invention will become apparent from the following description taken in connection with the accompanying drawings, wherein FIG. 1 is an elevational view partly in axial section of a preferred embodiment of the invention;

FIG. 2 is a sectional view taken substantially on line 2—2 of FIG. 1;

FIG. 3 is a sectional view taken on line 3—3 of FIG. 1 looking in the direction of the arrows;

DESCRIPTION OF THE PREFERRED EMBODIMENTS

Figure 4:
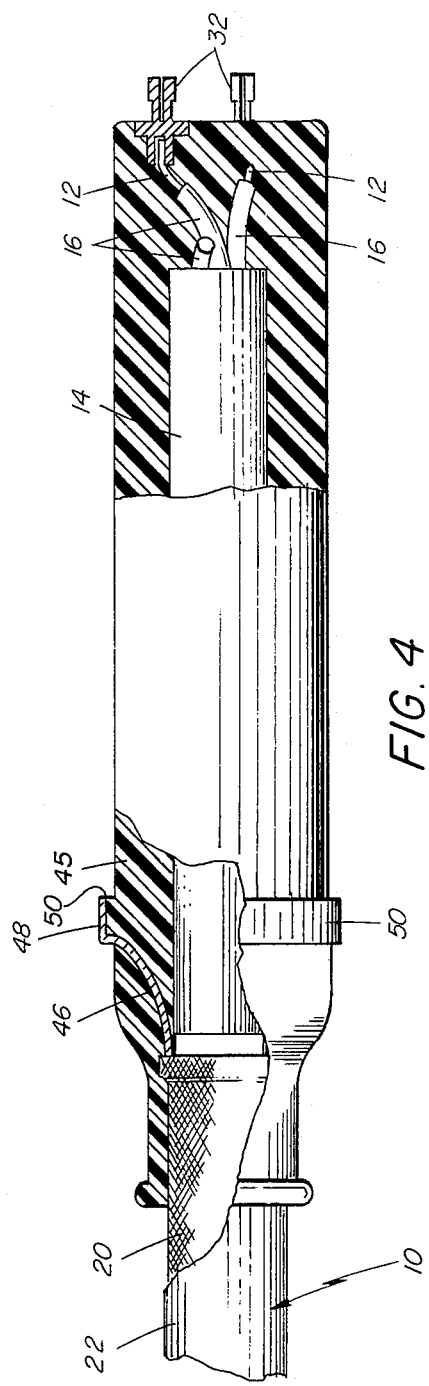
FIG. 4 is a view similar to FIG. 1 showing a second embodiment of the invention.

One form of the terminal according to the invention is shown applied to a cable 10 in FIG. 1, which cable includes a number of conductors encased within a layer of rubber compound 14. The conductors comprise wires 12 which are each provided with individual insulating coatings 16. The rubber layer 14 enclosing the conductors is wound with tape 18 (FIG. 2).

The cable is provided with grounding means in the form of a sheath 20 of copper or other metal braid which overlies the tape 18 and is enclosed within a protective covering 22 such as rayon braid.

The protective covering 22 and grounding braid 20 are foreshortened as shown in FIG. 1 so that the rubber layer 14 is exposed for a desired length such as, for example, about six inches. The end of the grounding braid 20 extends slightly beyond the end of the insulating sheath 22 and is fixed in conductive relation to one end of a corona shield 23 the other end of which is secured to a tubular grounding terminal 24 which may be straight or curved as desired. The near end of terminal 24 is provided with a peripheral flange 26 to which the end of the metal braid is attached as by soft solder or conductive epoxy. A nut 28 is located over the terminal 24 adjacent flange 26 to be threaded into a receiving ring (not shown) in a piece of equipment to which the cable is to be attached.

At the extreme end of the cable the rubber layer 14 is removed back approximately 1 ½ inches to expose the conductors. Four conductors are shown in FIGS. 1–3, the wires 12 of three of the conductors being attached to respective ring contacts 30 while the fourth is attached to a central pin contact 32.

Ring contacts 30 are axially spaced by annular dielectric spacers 34 of phenolic resin or the like, and the whole contact assembly is potted in a rigid dielectric material 36 such as epoxy which is an insulating compound suitable for filling the otherwise unoccupied space within the contact rings and spacers and around the conductors and lead wires, retaining them firmly in assembled relation. The wires 12 are soldered or otherwise conductively affixed to the contact rings and contact pin in the conventional manner.

The exposed insulation layer 14 of the cable is covered with a flexible shield 38 of heat shrinkable rubber or plastic tubing or flexible potting material such as ethylene propylene rubber, thus continuing to provide the terminal structure with flexibility while retaining the required insulating characteristics. The end of the shield 38 nearest the grounding terminal 24 is provided with an enlarged circumferential portion 40 which abuts the corona shield 23 and aids in retaining it in required conductive relation with the flange 26. Portion 40 also serves as a stop to limit the extent to which the terminal can be inserted into a mating coupling, thus assuring that the contact rings are properly located within the coupling.

Figure 5:
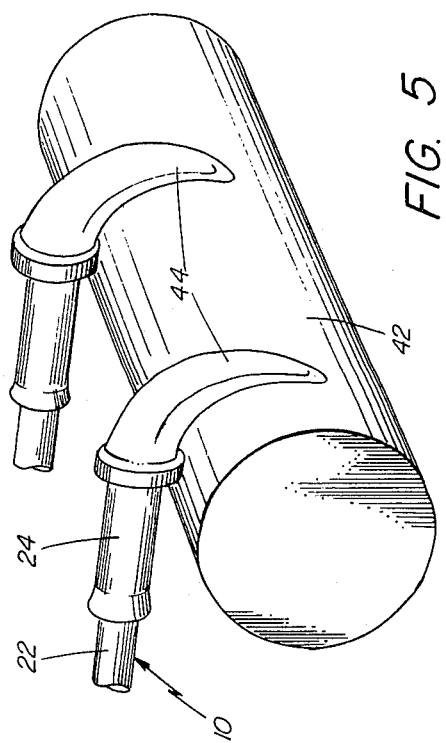
FIG. 5 is an isometric view of an x-ray device having cables attached thereto by a terminal structure embodying the invention.

For example, the described cable terminal may be used with an x-ray device as shown in FIG. 5 and which includes a housing 42 containing an x-ray generating tube (not shown) to which high voltage electrical energy is to be supplied. For this purpose female couplings or horns 44 are provided on the outside of the housing 42, and at or adjacent their inner ends the housing carries suitable electrical contacts which are adapted to be engaged by the ring contacts 30 when the cable terminals are inserted into the horns 44 as shown. The inner contacts are suitably connected to the x-ray tube so that energy from the cables is thus transmitted to the tube.

The horns may be made straight, as is conventional, or may be curved as shown in FIG. 5. Therefore, the cables may bend so as to extend from the housing at any angle, thus aiding in installation of the x-ray equipment with which the cables are to be used.

From the foregoing it will be apparent that a novel cable terminal has been provided which is flexible and is of much smaller diameter than known prior art high voltage cable terminals such as disclosed in aforementioned U.S. Pat. No. 2,522,572. For example, one of the presently described cable terminations has a larger diameter which is only about 1 ⅛ inches as opposed to the terminal shown in U.S. Pat. No. 2,522,572 which is usually about 2 ⅞ inches in diameter. Thus, the present cable and terminal can be easily pulled through conventional conduits as a completely terminated assembly.

In FIG. 4 a modified flexible cable terminal structure is shown and comprises a cable 10 wherein the metal braid cover 20 and insulating braid 22 are removed to expose the insulating rubber layer 14. Conductors extend from the end of the cable with their wires 12 being electrically connected to respective contact pins 32.

Over the rubber layer 14 is a layer 45 of heat shrinkable plastic or rubber tubing or flexible potting material such as ethylene propylene rubber which can be molded over the layer 14 to the desired thickness by known techniques. This will encapsulate the conductors as well as the wires 12 and the adjacent embedded portions of the contact pins 32.

The layer 45 is made to extend a short distance over the adjacent foreshortened ends of the metal braid 20 and insulating braid 22 as shown. However, one end of a metal grounding flare 46 which encircles the cable is inserted beneath the end of the metal braid 20 and secured thereto as by solder. The flare 46 passes through the flexible insulating sheath 45 and its opposite end terminates in a portion 48 which encases, at least partially, a slightly enlarged circumferential portion 50 of the sheath 45. Thus, the sheath 45 also retains the grounding flare 46 firmly in place.

It will be apparent that the modified terminal of FIG. 4 is also completely flexible and may be pulled through small diameter conduits and inserted into either curved or straight female couplings.

Accordingly, it will be apparent that all of the objectives of this invention have been achieved by the novel high voltage cable terminal described. It will be understood, however, that various changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. A bendable terminal for an electrical cable adapted to be inserted into a hollow receptacle, said terminal including a plurality of insulated conductors, a casing of flexible insulating material over the conductors, a metallic grounding sheath over the casing, and a flexible insulating layer over the grounding sheath, comprising an extended end portion of the cable wherein the casing has a portion extending substantially beyond the ends of the grounding sheath and insulating layer, the ends of said conductors extending beyond the end of the casing, a bendable shield of self-supporting insulating material covering said extended portion of the casing, said shield being completely flexible throughout its thickness, a corona shield encircling the casing and having one end electrically connected to the end of the grounding sheath, and a tubular metal grounding member encircling the cable and having one end electrically connected to said corona shield and having its major portion extending over the cable in a direction away from said extended portion of the casing.

2. A bendable terminal for an electrical cable adapted to be inserted into a hollow receptacle, said terminal including at least one insulated conductor, a casing of flexible insulating material over the conductor, a metallic grounding sheath over the casing, and a flexible insulating layer over the grounding sheath, comprising an extended portion of the cable wherein the casing has a portion extending substantially beyond the ends of the grounding sheath and insulating layer, the end of said conductor extending beyond the end of the casing, a bendable shield of self-supporting insulating material covering said extended portion of the casing, said shield being completely flexible throughout its thickness, and an annular corona shield encircling the casing and projecting outwardly through the bendable shield and having ends of different diameters, the smaller end being connected to the grounding sheath beneath the bendable shield and the larger end overlying a circumferential portion of the outer surface of the bendable shield.

* * * * *